(12) United States Patent
Maghsoodi

(10) Patent No.: US 10,948,025 B2
(45) Date of Patent: Mar. 16, 2021

(54) OVERLOAD CLUTCH WITH SECOND STAGE SETTING

(71) Applicant: GOODRICH CORPORATION, Charlotte, NC (US)

(72) Inventor: Bejan Maghsoodi, San Dimas, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 57 days.

(21) Appl. No.: 16/436,757

(22) Filed: Jun. 10, 2019

(65) Prior Publication Data
US 2020/0386277 A1    Dec. 10, 2020

(51) Int. Cl.
*F16D 13/54* (2006.01)
*B66D 1/16* (2006.01)
*F16D 23/12* (2006.01)

(52) U.S. Cl.
CPC .............. *F16D 13/54* (2013.01); *B66D 1/16* (2013.01); *F16D 23/12* (2013.01); *B66D 2700/0125* (2013.01); *F16D 2023/123* (2013.01)

(58) Field of Classification Search
CPC .... F16D 13/54; F16D 23/12; F16D 2023/123; F16D 13/56; F16D 2013/565; F16D 13/50; F16D 13/71; B66D 1/16; B66D 2700/0125
See application file for complete search history.

(56) References Cited

U.S. PATENT DOCUMENTS

| | | | |
|---|---|---|---|
| 8,192,126 B1 | 6/2012 | Young | |
| 9,353,893 B2* | 5/2016 | Ruby | B29C 48/287 |
| 9,914,625 B2 | 3/2018 | Maghsoodi | |
| 2015/0210359 A1* | 7/2015 | McClure | B63G 8/00 |
| | | | 114/333 |
| 2016/0288879 A1* | 10/2016 | Ono | F16H 63/46 |
| 2016/0298705 A1* | 10/2016 | Davies | F16D 43/216 |
| 2016/0340159 A1* | 11/2016 | Maghsoodi | B66D 1/12 |
| 2017/0166422 A1 | 6/2017 | Mahnken | |
| 2018/0251349 A1 | 9/2018 | Ijadi-Maghsoodi et al. | |

FOREIGN PATENT DOCUMENTS

| | | |
|---|---|---|
| DE | 102015202730 | 8/2016 |
| JP | S59231217 | 12/1984 |
| WO | 2017129178 | 8/2017 |

OTHER PUBLICATIONS

European Paent Office, European Search Report dated Aug. 3, 2020 in Application No. 19216323.6.

* cited by examiner

*Primary Examiner* — Mark A Manley
(74) *Attorney, Agent, or Firm* — Snell & Wilmer LLP

(57) ABSTRACT

A clutch having two stages for applying varied torque between an input shaft and an output shaft includes a clutchpack having input friction plates and output friction plates. The clutch further includes a first spring configured to apply a first pressure to the clutchpack to compress the clutchpack. The clutch further includes a second spring configured to apply a second pressure to the clutchpack to compress the clutchpack. The clutch further includes an engagement nut configured to move in response to rotation of the output shaft relative to the input shaft to compress the second spring in order to increase an amount of the second pressure applied to the clutchpack.

17 Claims, 5 Drawing Sheets

OVERLOAD CLUTCH WITH SECOND STAGE SETTING

FIELD

The present disclosure relates to two-stage clutches and, more particularly, to a two-stage clutch for use with a winch system, such as that used in an aircraft.

BACKGROUND

Some aircraft may include winches to raise or lower a payload. A winch cable may be attached to a motor-driven drum at one end and the payload at the other end. The motor may be driven to rotate the drum in order to gather the cable on the outer circumference of the drum. A clutch may be provided to transmit torque from the motor to the drum. In response to slipping of the clutch, the drum may be effectively disconnected from the motor. This disconnection reduces the likelihood of an overload experienced at the payload damaging the winch or a structure to which it is attached.

SUMMARY

Disclosed herein is a clutch having two stages for applying varied torque between an input shaft and an output shaft. The clutch includes a clutchpack having input friction plates and output friction plates. The clutch further includes a first spring configured to apply a first pressure to the clutchpack to compress the clutchpack. The clutch further includes a second spring configured to apply a second pressure to the clutchpack to compress the clutchpack. The clutch further includes an engagement nut configured to move in response to rotation of the output shaft relative to the input shaft to compress the second spring in order to increase an amount of the second pressure applied to the clutchpack.

Any of the foregoing embodiments may further include a basket having an inner surface configured to engage the input friction plates and an outer surface having basket threading, wherein the engagement nut further includes a nut inner surface having nut threading configured to engage with the basket threading.

In any of the foregoing embodiments, the engagement nut is configured to rotate with the output shaft and the basket is configured to rotate with the input shaft such that engagement between the basket threading and the nut threading moves the engagement nut to compress the second spring in response to rotation of the output shaft relative to the input shaft.

In any of the foregoing embodiments, the input shaft is coupled to the input friction plates via the basket, and the output shaft is directly coupled to the output friction plates.

In any of the foregoing embodiments, the basket is coupled to the input friction plates via basket splines, and the output shaft is coupled to the output friction plates via output splines.

Any of the foregoing embodiments may also include a first pressure plate, wherein the first pressure plate is coupled to the output shaft and configured to rotate with the output shaft, and the first pressure plate is engaged with the engagement nut such that the engagement nut rotates with the first pressure plate and the output shaft.

In any of the foregoing embodiments, the engagement nut is configured to disengage from the first pressure plate in response to a predetermined quantity of rotations of the input shaft relative to the output shaft to limit the amount of the second pressure applied to the clutchpack by the second spring.

Any of the foregoing embodiments may further include a first pressure plate and a second pressure plate; a first needle bearing located between the first pressure plate and the basket and configured to reduce friction between the first pressure plate and the basket; and a second needle bearing located between the second pressure plate and the engagement nut and configured to reduce friction between the second pressure plate and the engagement nut.

Any of the foregoing embodiments may further include a ball configured to be located between the basket and the input shaft and configured to set a maximum transferred torque of the clutch.

Also disclosed is a clutch having two stages for applying varied torque between an input shaft and an output shaft. The clutch includes a clutchpack having input friction plates and output friction plates. The clutch further includes a first spring configured to apply a first pressure to the clutchpack to compress the clutchpack. The clutch further includes a second spring configured to apply a second pressure to the clutchpack to compress the clutchpack. The clutch further includes a basket having an inner surface configured to engage the input friction plates. The clutch further includes an engagement nut configured to be moved by the basket in response to rotation of the output shaft relative to the input shaft to compress the second spring in order to increase an amount of the second pressure applied to the clutchpack.

In any of the foregoing embodiments, the basket has an outer surface having basket threading and the engagement nut further includes a nut inner surface having nut threading and configured to engage with the basket threading.

In any of the foregoing embodiments, the engagement nut is configured to rotate with the output shaft and the basket is configured to rotate with the input shaft such that engagement between the basket threading and the nut threading moves the engagement nut to compress the second spring in response to rotation of the output shaft relative to the input shaft.

In any of the foregoing embodiments, the input shaft is coupled to the input friction plates via the basket, and the output shaft is directly coupled to the output friction plates.

In any of the foregoing embodiments, the basket is coupled to the input friction plates via basket splines, and the output shaft is coupled to the output friction plates via output splines.

Any of the foregoing embodiments may further include a first pressure plate coupled to the output shaft and configured to rotate with the output shaft, and being engaged with the engagement nut such that the engagement nut rotates with the first pressure plate and the output shaft.

In any of the foregoing embodiments, the engagement nut is configured to disengage from the first pressure plate in response to a predetermined quantity of rotations of the input shaft relative to the output shaft to limit the amount of the second pressure applied to the clutchpack by the second spring.

Any of the foregoing embodiments may further include a first pressure plate and a second pressure plate; a first needle bearing located between the first pressure plate and the basket and configured to reduce friction between the first pressure plate and the basket; and a second needle bearing located between the second pressure plate and the engagement nut and configured to reduce friction between the second pressure plate and the engagement nut.

Also disclosed is a clutch having two stages for applying varied torque between an input shaft and an output shaft. The clutch includes a clutchpack having input friction plates and output friction plates. The clutch further includes a first pressure plate. The clutch further includes a first spring configured to apply a first pressure to the first pressure plate to compress the clutchpack. The clutch further includes a second pressure plate. The clutch further includes a second spring configured to apply a second pressure to the second pressure plate to compress the clutchpack. The clutch further includes a basket having an inner surface configured to engage the input friction plates and an outer surface having basket threading. The clutch further includes an engagement nut having a nut outer surface having nut threading configured to engage with the basket threading such that rotation of the output shaft relative to the input shaft moves the engagement nut via engagement between the basket threading and the nut threading to compress the second spring in order to increase an amount of the second pressure applied to the second pressure plate.

In any of the foregoing embodiments, the engagement nut is configured to rotate with the output shaft and the basket is configured to rotate with the input shaft such that engagement between the basket threading and the nut threading moves the engagement nut to compress the second spring in response to rotation of the output shaft relative to the input shaft; the first pressure plate is coupled to the output shaft and configured to rotate with the output shaft; and the first pressure plate is engaged with the engagement nut such that the engagement nut rotates with the first pressure plate and the output shaft.

In any of the foregoing embodiments, the engagement nut is configured to disengage from the first pressure plate in response to a predetermined quantity of rotations of the input shaft relative to the output shaft to limit the amount of the second pressure applied to the second pressure plate by the second spring.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
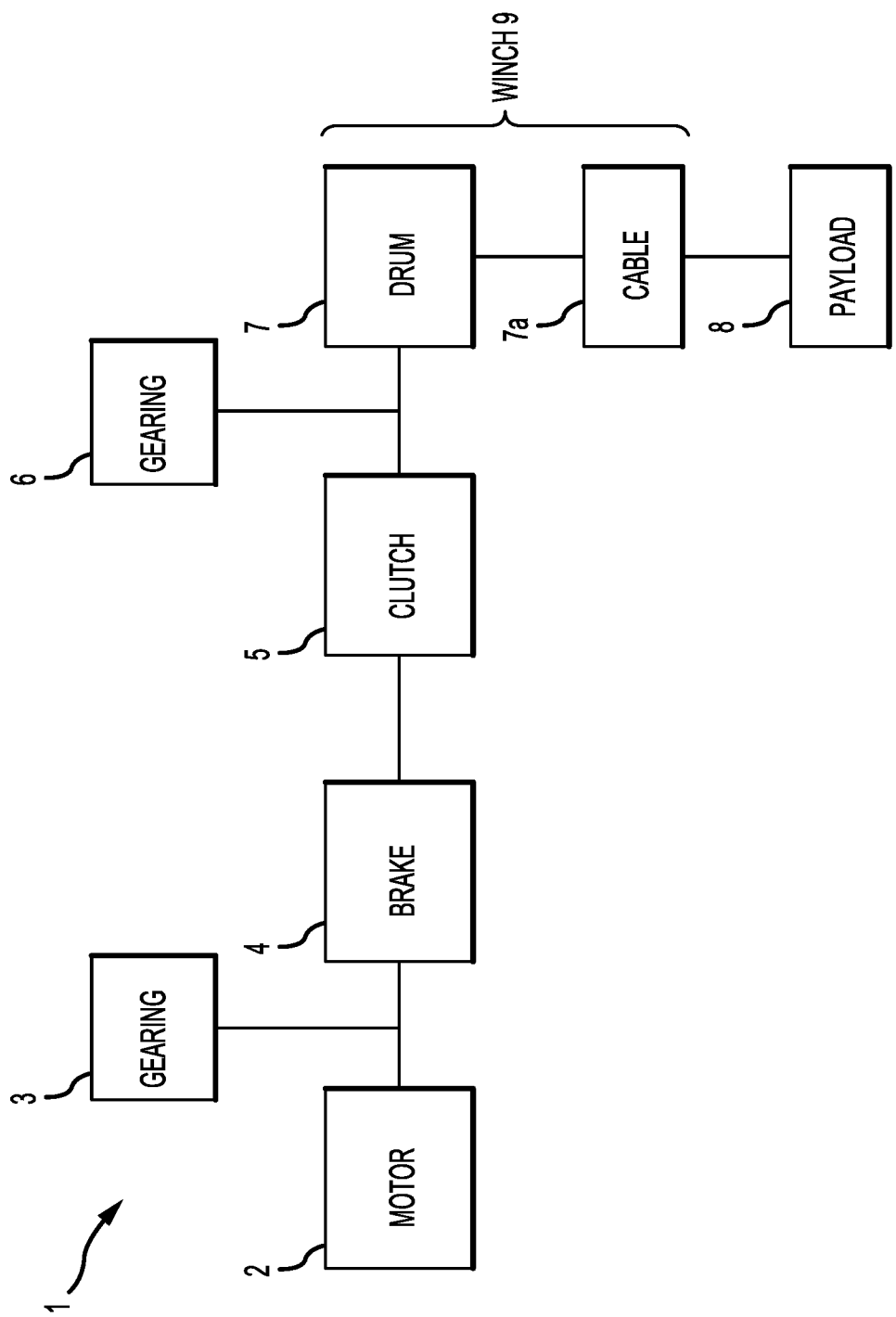
FIG. 1 illustrates a block diagram of a winch system, in accordance with various embodiments.

Turning to FIG. 1, a winch system 1 is shown. A driving means, such as a motor 2, is operatively connected to a brake 4 through gearing 3, which is operatively connected to the clutch 5, which is operatively connected to a drum 7 through gearing 6. The motor 2 is activated to provide drive to the drum 7 through the gearing 3, the brake 4, the clutch 5, and the gearing 6, to wind up (or release) a winch cable 7a to lift (or drop) a payload 8. The drum 7 and the cable 7a together form a winch 9. The brake 4 is provided as a means to stop cable winding without disengaging the motor 2, whereas the clutch 5 acts as a moderating means for the drive, allowing the drum 7 to be disconnected from the motor 2 should the drum 7 become overloaded.

Referring now to FIGS. 2, 3, 4, and 5, additional details of the clutch 5 are shown. The clutch 5 is designed to operate between an input shaft 100 and an output shaft 102, and may be oriented about an axis X-X'. The input shaft 100 may be coupled to the brake 4 of FIG. 1, and the output shaft 102 may be coupled to the gearing 6 and/or the drum 7 of FIG. 1.

The clutch 5 may include a clutchpack 104 which includes input friction plates 106 coupled to and configured to rotate with the input shaft 100, and output friction plates 108 coupled to and configured to rotate with the output shaft 102. For example, the output shaft 102 may include output splines 134 that engage the output friction plates 108, thus coupling the output friction plates 108 to the output shaft 102.

The clutch 5 may also include a first pressure plate 110, a first spring 112, a second pressure plate 114, and a second spring 116. The first spring 112 and the second spring 116 may be, for example, Belleville springs.

The clutch 5 may further include a basket 118 having an inner surface 120 and an outer surface 124. The basket 118 may be coupled to the input shaft 100 (such coupling may be a direct coupling or may be via one or more ball 140) and may rotate along with the input shaft 100. The basket 118 may include basket splines 122 located on the inner surface 120 and basket threading 126 located on the outer surface 124. The basket splines 122 may interface with the input friction plates 106, thus coupling the input friction plates 106 to the input shaft 100.

The clutch 5 may also include an engagement nut 128. The engagement nut 128 may have a nut inner surface 130 that includes nut threading 132. The nut threading 132 may interface with the basket threading 126 of the basket 118.

The first pressure plate 110 may be coupled to the output shaft 102 via plate splines 142, which may engage with the output splines 134. The first pressure plate 110 may engage with a flange 144 of the engagement nut 128, such as via splines or keys. This engagement between the first pressure plate 110 and the output shaft 102, and between the first pressure plate 110 and the engagement nut 128, results in rotation of the first pressure plate 110 and the engagement nut 128 in response to rotation of the output shaft 102.

The clutch 5 may further include a first needle bearing 136 and a second needle bearing 138. The first needle bearing 136 may be positioned axially between the basket 118 and the first pressure plate 110 and may reduce friction between the basket 118 and the first pressure plate 110. The second needle bearing 138 may be positioned axially between the engagement nut 128 and the second pressure plate 114 and may reduce friction between the engagement nut 128 and the second pressure plate 114.

The clutch 5 may further include an adjustment nut 146. The adjustment nut 146 may be used to compress or decompress the first spring 112 and the second spring 116, thus adjusting an amount of pressure applied to the clutchpack 104 by the first spring 112 and the second spring 116.

Figure 2:
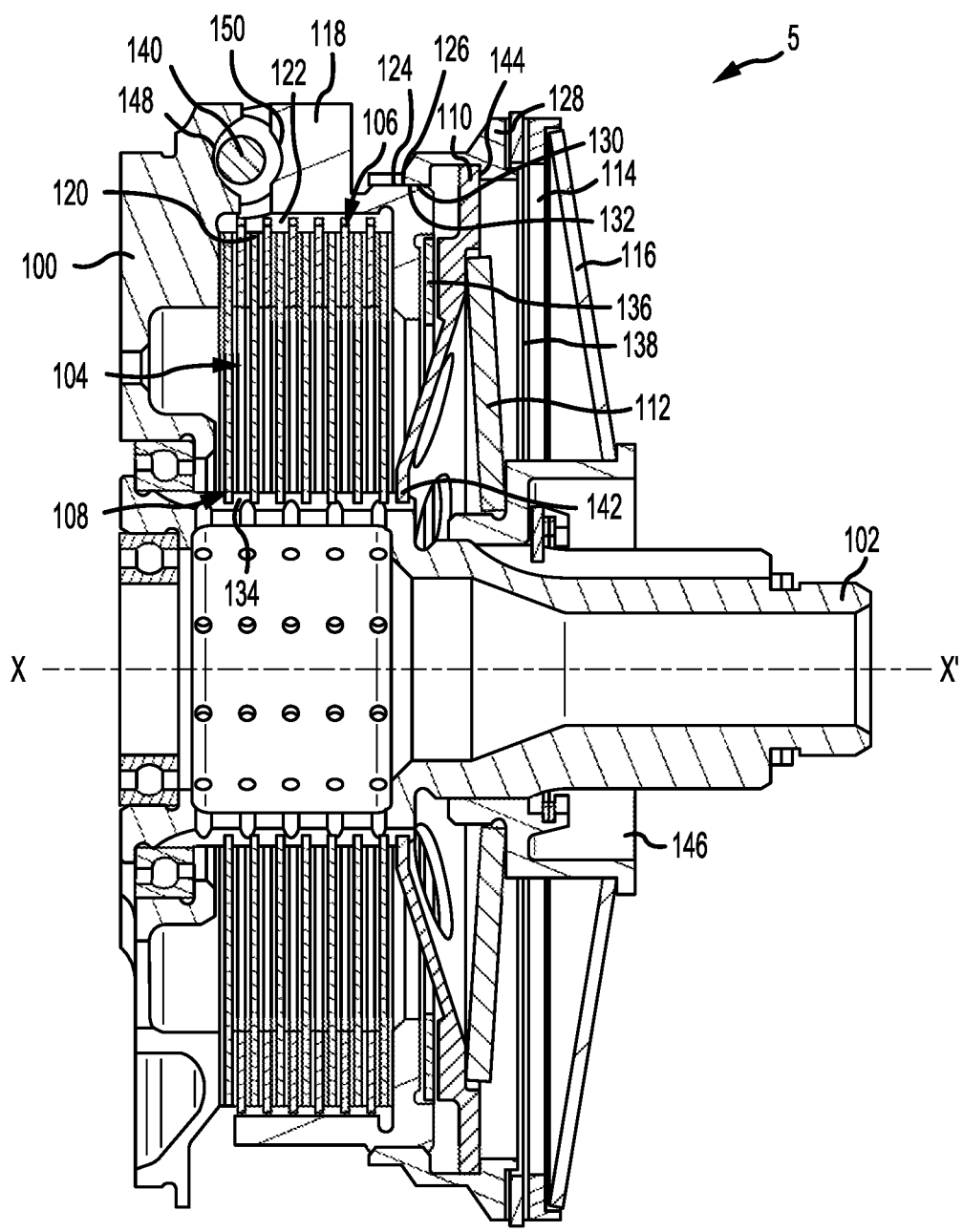
FIG. 2 illustrates a cross-sectional view of a two-stage clutch in a first stage, the two-stage clutch being for use with a winch system, in accordance with various embodiments.
Figure 3:
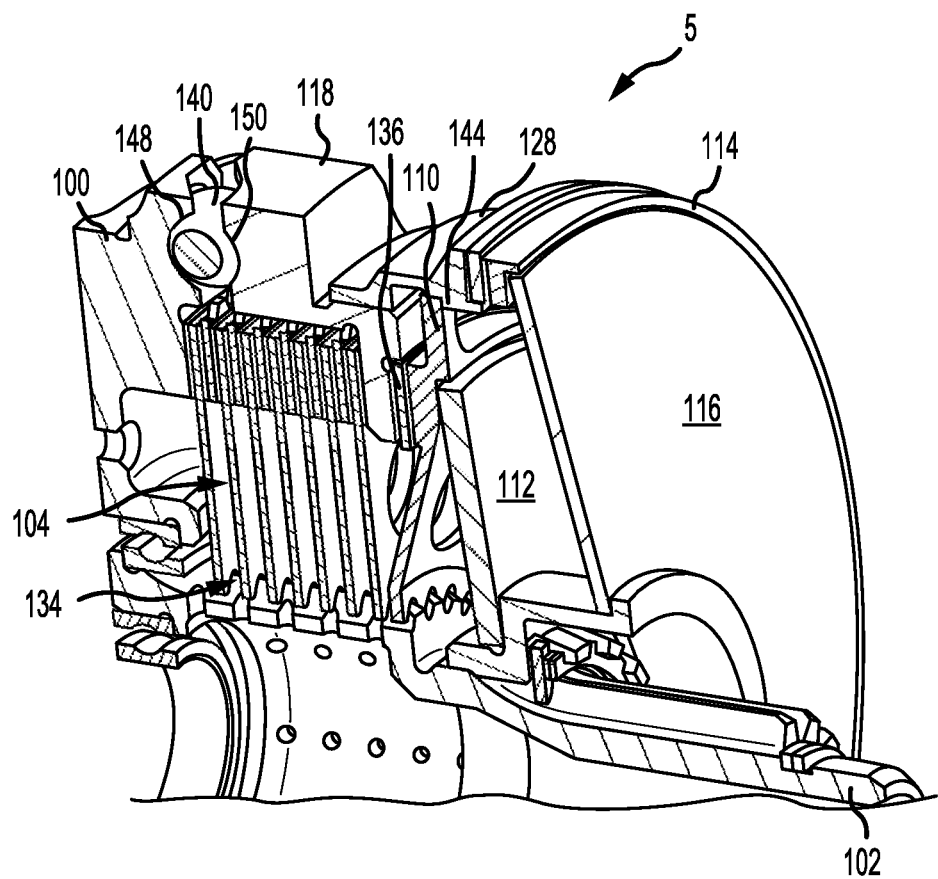
FIG. 3 illustrates a perspective cross-sectional view of the two-stage clutch of FIG. 2 in the first stage, in accordance with various embodiments.

During normal operation of the clutch 5 (i.e., a non-overload operation, as shown in FIGS. 2 and 3), torque applied to the input shaft 100 may be transferred to the input friction plates 106 via the basket 118. The first spring 112 may apply axial pressure to the clutchpack 104 via the first pressure plate 110. This pressure increases friction between the input friction plates 106 and the output friction plates 108, allowing the torque applied to the input shaft 100 to transfer through the clutchpack 104 to the output shaft 102. In this operational state, the second spring 116 may apply relatively little pressure to the clutchpack 104 via the second pressure plate 114 (and intermediate elements).

Figure 4:
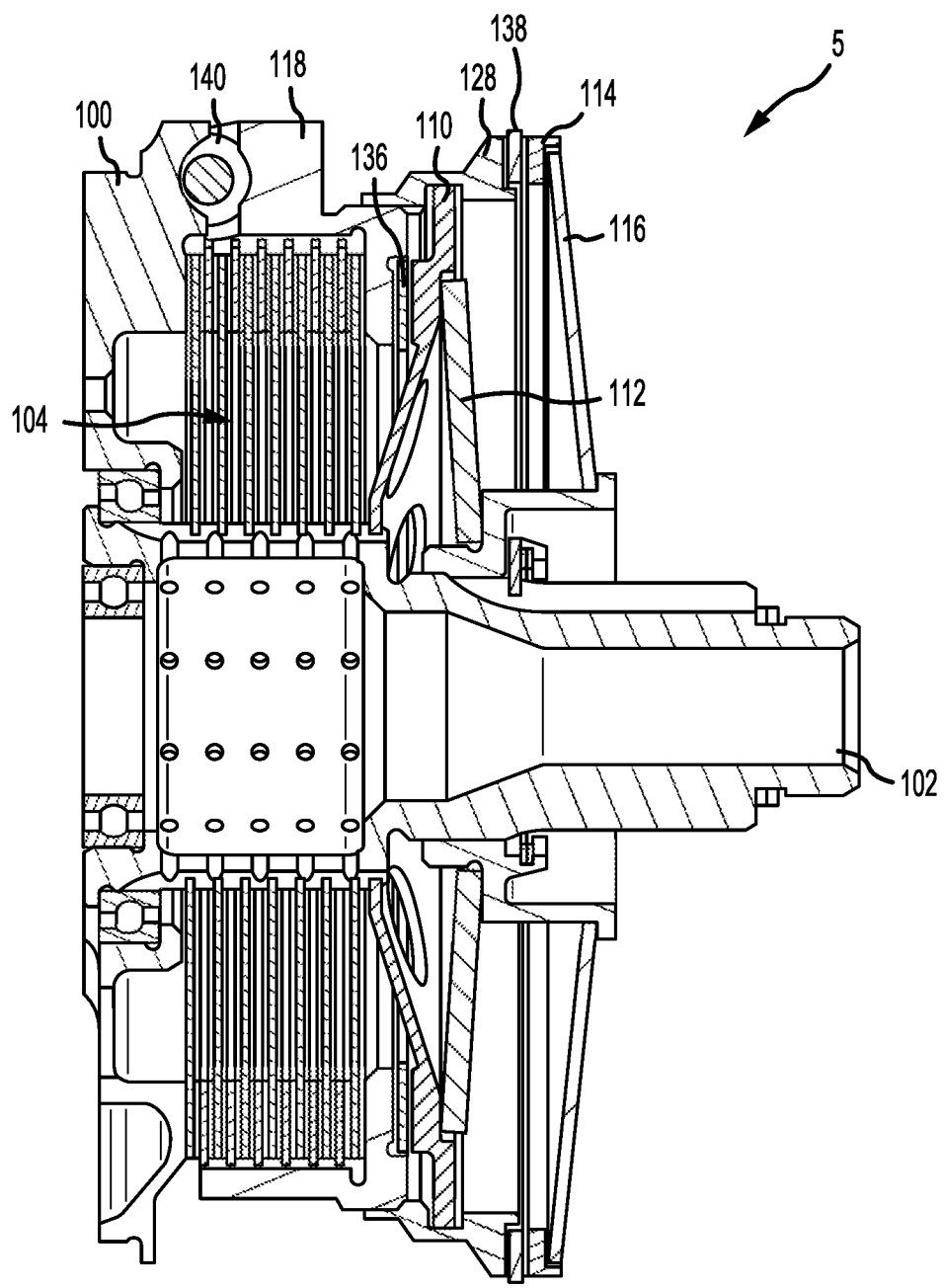
FIG. 4 illustrates a cross-sectional view of the two-stage clutch of FIG. 2 in a second stage, in accordance with various embodiments.
Figure 5:
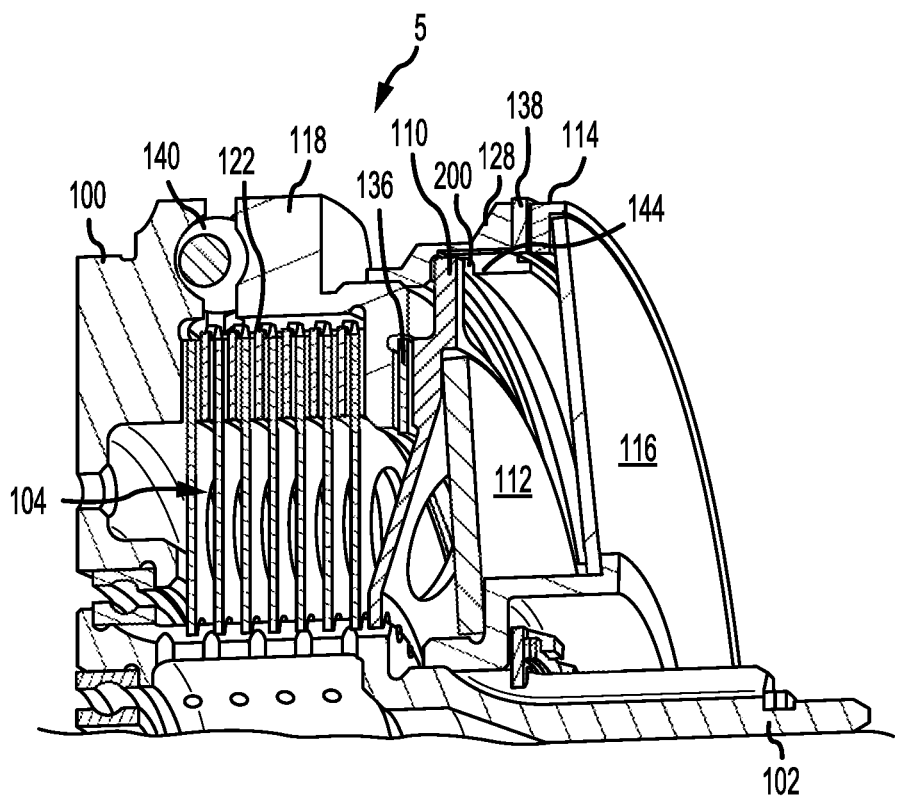
FIG. 5 illustrates a perspective cross-sectional view of the two-stage clutch of FIG. 2 in the second stage, in accordance with various embodiments.

In certain situations, the torque applied to the output shaft 102 may be greater than the amount of torque which may be transferred through the output friction plates 108 to the input friction plates 106 (i.e., an overload condition, as shown in FIGS. 4 and 5). In such situations, the output shaft 102 may rotate relative to the input shaft 100. Due to the coupling of the engagement nut 128 and the first pressure plate 110 to the output shaft 102, and the coupling of the basket 118 to the input shaft 100, the engagement nut 128 may rotate relative to the basket 118 in response to rotation of the output shaft 102 relative to the input shaft 100. In response to this rotation, the basket threading 126 engages the nut threading 132 and forces the engagement nut 128 towards the second spring 116.

The movement of the engagement nut 128 towards the second spring 116 compresses the second spring 116, thus increasing pressure applied to the clutchpack 104 by the second spring 116. In that regard, the second spring 116 may provide an increased amount of pressure to the clutchpack 104 (i.e., via the second pressure plate 114 and intermediate elements) as the engagement nut 128 is axially translated. Stated differently, relative rotation between the input shaft 100 and the output shaft causes the engagement nut 128 to translate axially towards the second spring 116, thus compressing the second spring 116 and increasing pressure applied to the clutchpack 104 by the second spring 116. This increased pressure increases friction between the input friction plates 106 and the output friction plates 108, allowing the clutch 5 to increase torque transfer between the input shaft 100 and the output shaft 102.

It may be undesirable to allow an unlimited increase in friction between the input friction plates 106 and the output friction plates 108. In that regard, a gap 200 may be defined by the engagement nut 128 adjacent to the flange 144. In response to a predetermined amount of rotation of the engagement nut 128 relative to the basket 118, the first pressure plate 110 may be located in the gap 200, reducing the likelihood of further rotation of the engagement nut 128 relative to the basket 118 (i.e., due to lack of engagement between the first pressure plate 110 and the engagement nut 128). In that regard, the second spring 116 fails to continue being compressed by the engagement nut 128 in response to the first pressure plate 110 being located in the gap 200. In such a state, the output shaft 102 may continue rotating relative to the input shaft 100 if sufficient torque is applied to the output shaft 102.

The ball 140 may be located between the input shaft 100 and the basket 118 and may operate to set a maximum transferred torque between the input shaft 100 and the output shaft 102. For example, the ball 140 may operate as a ball ramp assembly. The input shaft 100 and the basket 118 may define recesses 148, 150 which may be shaped to act as camming surfaces or ramps that cam against the ball 140 and cause the ball 140 to roll circumferentially (i.e., in the direction of rotation of the input shaft 100 and the output shaft 102) along the recesses 148, 150. This movement of the ball 140 may increase or decrease the separation between the input shaft 100 and the basket 118. An increase in separation causes the friction plates of the clutchpack 104 to separate, thus reducing friction between the friction plates, allowing the clutch 5 to slip in response to the maximum transferred torque setting being surpassed.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A clutch having two stages for applying varied torque between an input shaft and an output shaft, the clutch comprising:
    a clutchpack having input friction plates and output friction plates;
    a first spring configured to apply a first pressure to the clutchpack to compress the clutchpack;
    a second spring configured to apply a second pressure to the clutchpack to compress the clutchpack; and
    an engagement nut rotatably coupled to a first pressure plate of the clutchpack and configured to rotate with the first pressure plate in response to rotation of the output shaft relative to the input shaft to compress the second spring in order to increase an amount of the second pressure applied to the clutchpack,
    wherein the engagement nut defines a gap such that the first pressure plate is located within the gap to disengage the first pressure plate from the engagement nut in response to a predetermined quantity of rotations of the input shaft relative to the output shaft to limit the amount of the second pressure applied to the clutchpack by the second spring.

2. The clutch of claim 1, further comprising a basket having an inner surface configured to engage the input friction plates and an outer surface having basket threading, wherein the engagement nut further includes a nut inner surface having nut threading configured to engage with the basket threading.

3. The clutch of claim 2, wherein the engagement nut is configured to rotate with the output shaft and the basket is configured to rotate with the input shaft such that engagement between the basket threading and the nut threading moves the engagement nut to compress the second spring in response to rotation of the output shaft relative to the input shaft.

4. The clutch of claim 3, wherein the input shaft is coupled to the input friction plates via the basket, and the output shaft is directly coupled to the output friction plates.

5. The clutch of claim 4, wherein the basket is coupled to the input friction plates via basket splines, and the output shaft is coupled to the output friction plates via output splines.

6. The clutch of claim 3, wherein the first pressure plate is coupled to the output shaft and configured to rotate with the output shaft, and the first pressure plate is engaged with the engagement nut such that the engagement nut rotates with the first pressure plate and the output shaft.

7. The clutch of claim 2, further comprising: a second pressure plate;
    a first needle bearing located between the first pressure plate and the basket and configured to reduce friction between the first pressure plate and the basket; and
    a second needle bearing located between the second pressure plate and the engagement nut and configured to reduce friction between the second pressure plate and the engagement nut.

8. The clutch of claim 2, further comprising a ball configured to be located between the basket and the input shaft and configured to set a maximum transferred torque of the clutch.

9. A clutch having two stages for applying varied torque between an input shaft and an output shaft, the clutch comprising:
    a clutchpack having input friction plates and output friction plates;
    a first spring configured to apply a first pressure to the clutchpack to compress the clutchpack;
    a second spring configured to apply a second pressure to the clutchpack to compress the clutchpack;
    a basket having an inner surface configured to engage the input friction plates; and
    an engagement nut rotatably coupled to a first pressure plate of the clutchpack and configured to rotate with the first pressure plate in response to rotation of the output shaft relative to the input shaft to compress the second spring in order to increase an amount of the second pressure applied to the clutchpack,
    wherein the engagement nut defines a gap such that the first pressure plate is located within the gap to disengage the first pressure plate from the engagement nut in response to a predetermined quantity of rotations of the input shaft relative to the output shaft to limit the amount of the second pressure applied to the clutchpack by the second spring.

10. The clutch of claim 9, wherein the basket has an outer surface having basket threading and the engagement nut further includes a nut inner surface having nut threading and configured to engage with the basket threading.

11. The clutch of claim 10, wherein the engagement nut is configured to rotate with the output shaft and the basket is configured to rotate with the input shaft such that engagement between the basket threading and the nut threading moves the engagement nut to compress the second spring in response to rotation of the output shaft relative to the input shaft.

12. The clutch of claim 11, wherein the input shaft is coupled to the input friction plates via the basket, and the output shaft is directly coupled to the output friction plates.

13. The clutch of claim 12, wherein the basket is coupled to the input friction plates via basket splines, and the output shaft is coupled to the output friction plates via output splines.

14. The clutch of claim 11, wherein the first pressure plate is coupled to the output shaft and configured to rotate with the output shaft.

15. The clutch of claim 10, further comprising: a second pressure plate;
   a first needle bearing located between the first pressure plate and the basket and configured to reduce friction between the first pressure plate and the basket; and
   a second needle bearing located between the second pressure plate and the engagement nut and configured to reduce friction between the second pressure plate and the engagement nut.

16. A clutch having two stages for applying varied torque between an input shaft and an output shaft, the clutch comprising:
   a clutchpack having input friction plates and output friction plates;
   a first pressure plate;
   a first spring configured to apply a first pressure to the first pressure plate to compress the clutchpack;
   a second pressure plate;
   a second spring configured to apply a second pressure to the second pressure plate to compress the clutchpack;
   a basket having an inner surface configured to engage the input friction plates and an outer surface having basket threading; and
   an engagement nut rotatably coupled to the first pressure plate, configured to rotate with the first pressure plate, and having a nut outer surface having nut threading configured to engage with the basket threading such that rotation of the output shaft relative to the input shaft moves the engagement nut via engagement between the basket threading and the nut threading to compress the second spring in order to increase an amount of the second pressure applied to the second pressure plate, wherein the engagement nut defines a gap such that the first pressure plate is located within the gap to disengage the first pressure plate from the engagement nut in response to a predetermined quantity of rotations of the input shaft relative to the output shaft to limit the amount of the second pressure applied to the clutchpack by the second spring.

17. The clutch of claim 16, wherein: the engagement nut is configured to rotate with the output shaft and the basket is configured to rotate with the input shaft such that engagement between the basket threading and the nut threading moves the engagement nut to compress the second spring in response to rotation of the output shaft relative to the input shaft; the first pressure plate is coupled to the output shaft and configured to rotate with the output shaft; and the first pressure plate is engaged with the engagement nut such that the engagement nut rotates with the first pressure plate and the output shaft.

* * * * *